United States Patent

Pierce

[11] Patent Number: 5,927,108
[45] Date of Patent: Jul. 27, 1999

[54] WHEEL LOCK

[76] Inventor: Carl W. Pierce, P.O. Box 177, Grand Bay, Ala. 36541

[21] Appl. No.: 09/080,558

[22] Filed: May 18, 1998

[51] Int. Cl.[6] .................................................. E05B 73/00
[52] U.S. Cl. .................................. 70/19; 70/226; 188/32
[58] Field of Search .................................. 70/14, 18, 19, 70/209, 225, 226, 237, 238; 188/32

[56] References Cited

U.S. PATENT DOCUMENTS

| | | | |
|---|---|---|---|
| 1,488,893 | 4/1924 | Plouffe | 70/226 |
| 4,768,359 | 9/1988 | Wade | 70/14 |
| 4,819,462 | 4/1989 | Apsell | 70/14 |
| 5,134,868 | 8/1992 | Bethards | 70/18 |
| 5,315,848 | 5/1994 | Beyer | 70/226 X |
| 5,333,477 | 8/1994 | Davis | 70/226 |
| 5,372,018 | 12/1994 | Smith | 70/226 X |
| 5,375,442 | 12/1994 | Hammer | 70/226 |
| 5,437,171 | 8/1995 | Owen | 70/14 |
| 5,520,034 | 5/1996 | Edmondson | 70/226 |
| 5,582,044 | 12/1996 | Bolich | 70/19 X |
| 5,613,385 | 3/1997 | Yamabe | 70/226 |
| 5,628,212 | 5/1997 | Fritzler | 70/19 |
| 5,639,001 | 6/1997 | Brady | 780/226 X |
| 5,673,574 | 10/1997 | Bertram | 70/18 |
| 5,689,981 | 11/1997 | DeLuca et al. | 70/226 |
| 5,724,839 | 3/1998 | Thering | 70/226 X |
| 5,778,706 | 7/1998 | Testa | 70/14 |

FOREIGN PATENT DOCUMENTS

| | | | |
|---|---|---|---|
| 2106058 | 4/1983 | United Kingdom | 70/226 |
| 86/05150 | 9/1986 | WIPO | 70/226 |

*Primary Examiner*—Suzanne Dino Barrett
*Attorney, Agent, or Firm*—Joseph N. Breaux

[57] ABSTRACT

A wheel lock is disclosed which comprises a pair of tire width adjustable hooks members which are slidably positionable for tire diameter adjustment and locking. A pair of chocks are also provided for meshing with an inside rim surface of a wheel to be locked which prevents the device from rotating as a tire. The width adjustment is only accessible when the device is not installed while the tire diameter adjustment also serves as a keyed locking mechanism for the device. The device is constructed of lightweight tubular components and is particularly adaptable for use on trailers, motorcycles and ATVs.

2 Claims, 2 Drawing Sheets

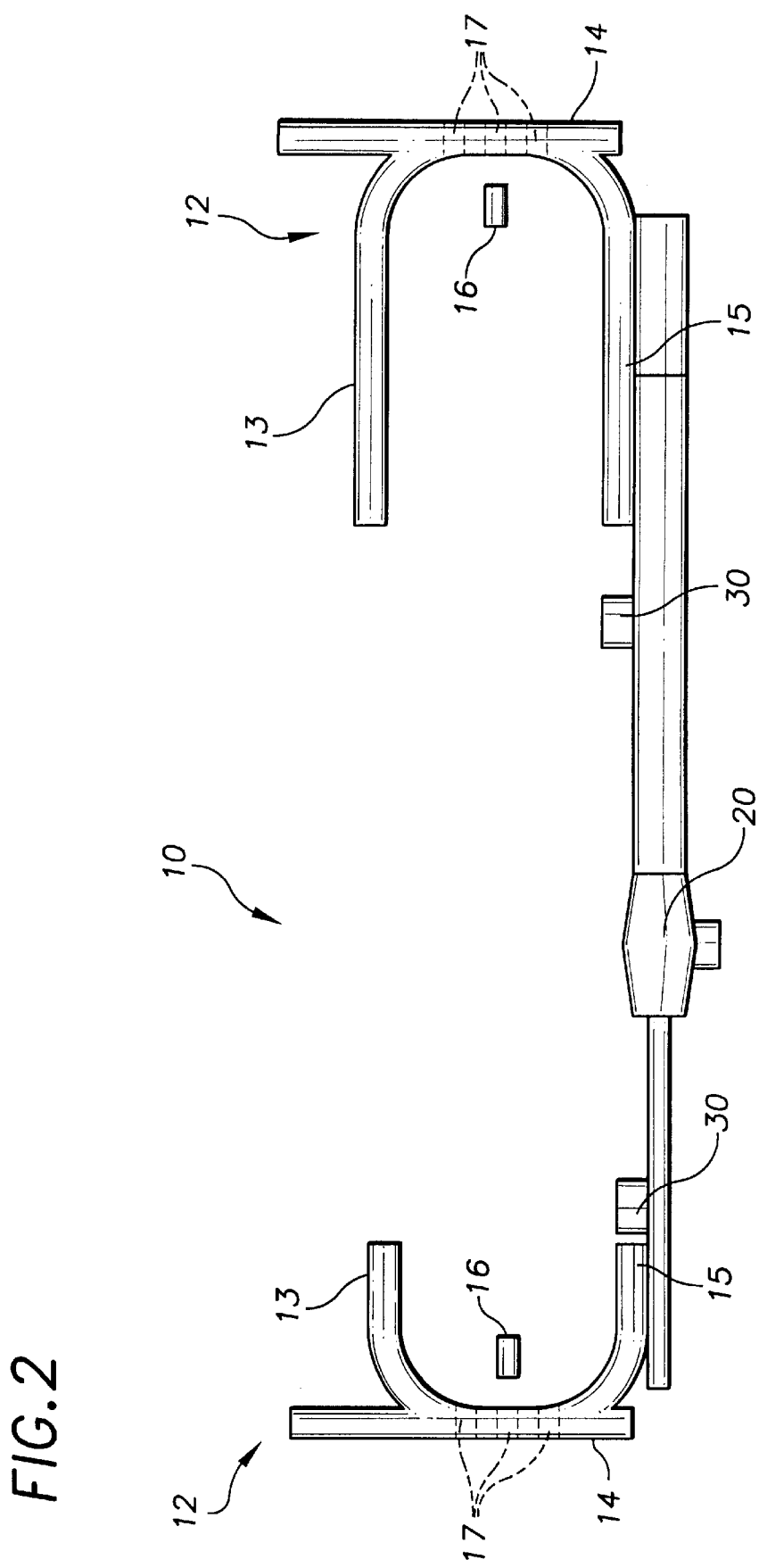

WHEEL LOCK

TECHNICAL FIELD

The present invention relates to devices and methods for wheel locks and more particularly to devices and methods for an adjustable wheel lock which is lightweight and adjustable for both tire diameter and tire width, and which is particularly suitable for small trailers, motorcycles, ATVs and the like.

BACKGROUND ART

Numerous anti-theft wheel lock devices have been disclosed and patented. Despite the numerous prior art inventions there has never been a device which is lightweight, adjustable for wheel diameter and wheel width and designed and constructed for minimal expense and particularly suitable for small trailer tires, motorcycles and ATVs.

The prior art patents which are relevant are as follows:

Deluca, et al U.S. Pat. No. 5,689,981 discloses an anti-theft vehicle wheel lock which includes a chock connected to a facing bar which in turn includes an engaging bar both of which are slidably adjustable for various wheel sizes and widths, this device is extremely strong and useful for chocking and locking vehicle tires in place however the construction and design of this device does not lend itself for use with small trailers and/or motorcycles as the present invention which is constructed of lightweight tubular members which are adjustable in both diameter and wheel width without requiring the use of a heavy chock member.

Bertran U.S. Pat. No. 5,673,574 discloses a vehicle wheel immobilizing clamp which comprises a pair of flat plates coupled together by a pivot pin so that the surfaces of the plates slide one on the other. This device is also extremely useful however it is not adaptable to motorcycle tires, and ATV vehicles as the present invention. Furthermore, the device is not adjustable for various wheel diameters.

Fritzler U.S. Pat. No. 5,628,212 discloses an anti-theft device for immobilizing the wheel of a motor vehicle which comprises a chocking member which is clamped to a tread of a tire on the vehicle. This device is also useful however it does not lend itself for adaption to wheels of varying diameter and width. Furthermore the device is defeated by removal of the locked wheel.

Edmondson U.S. Pat. No. 5,520,034 discloses a wheel locking device for a trailer which comprises a hook member attached to an adjustable locking arm which is therein attached to a wheel bolt. This device is useful for trailers however it is not adaptable for use on motorcycles or other vehicles without wheel bolts as the present invention. Owen U.S. Pat. No. 5,437,171 discloses a device for preventing free rotation of a wheel of a stationary vehicle, this device is extremely strong and useful however it is not adjustable for tire width and diameter as the present invention. Furthermore the device is constructed of unduly heavy materials rendering the device particularly not suitable for smaller trailers, motorcycles and/or ATVs.

Davis U.S. Pat. No. 5,333,477 discloses a vehicle parking boot constructed of lightweight tubular components. This device is extremely useful however it is not adjustable for tire width as the present invention and furthermore it does not provide a device adaptable for use on motorcycles and ATVs as the present invention.

GENERAL SUMMARY DISCUSSION OF INVENTION

As will be seen in the following description the present device includes two slidably positionable locking hooks each having expandable width with locking pins which are not accessible when the device is locked on the tire, furthermore the lock is provided by drawing the two locking hooks around the tire and securing in position with a keyed lock, while two wheel chocks are provided on each of the U shaped locking hooks for preventing rotation of the wheel.

It is thus an object of the invention to provide a portable wheel lock that is adaptable for use on small trailer tires, motorcycles and ATVs.

It is a further object of the invention to provide a wheel lock that is constructed of lightweight tubular members and which at the same time provides a high strength locking mechanism for preventing the rotation of a wheel on a trailer, motorcycle or ATV.

It is a still further object of the invention to provide a wheel lock that comprises two slidably positionable locking hooks each having expandable width by use of locking pins which are inaccessible when the device is attached to a tire and which slidable hooks are adjustable locked around a tire by use of a keyed locking means while a pair of chocks are engaged to the interior surface of the vehicle wheel for preventing wheel rotation once the device is locked into position.

Accordingly a wheel lock is provided which comprises a tubular wheel lock mechanism which is constructed of durable, lightweight tubular members which is particularly adaptable for use with small trailer tires, motorcycles, and ATVs and which comprises two tubular slidably positionable locking hooks each having expandable width by use of locking pins which are inaccessible when the device is installed on a tire, furthermnore the device comprises a tire diameter locking means which provides a means for tightening and locking the device around the diameter of the tire while a pair of wheel chocks prevents the tire from rotating when the device is installed.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is a top plain view of the wheel locking device illustrating the components of the device.

EXEMPLARY MODE FOR CARRYING OUT THE INVENTION

Figure 1:
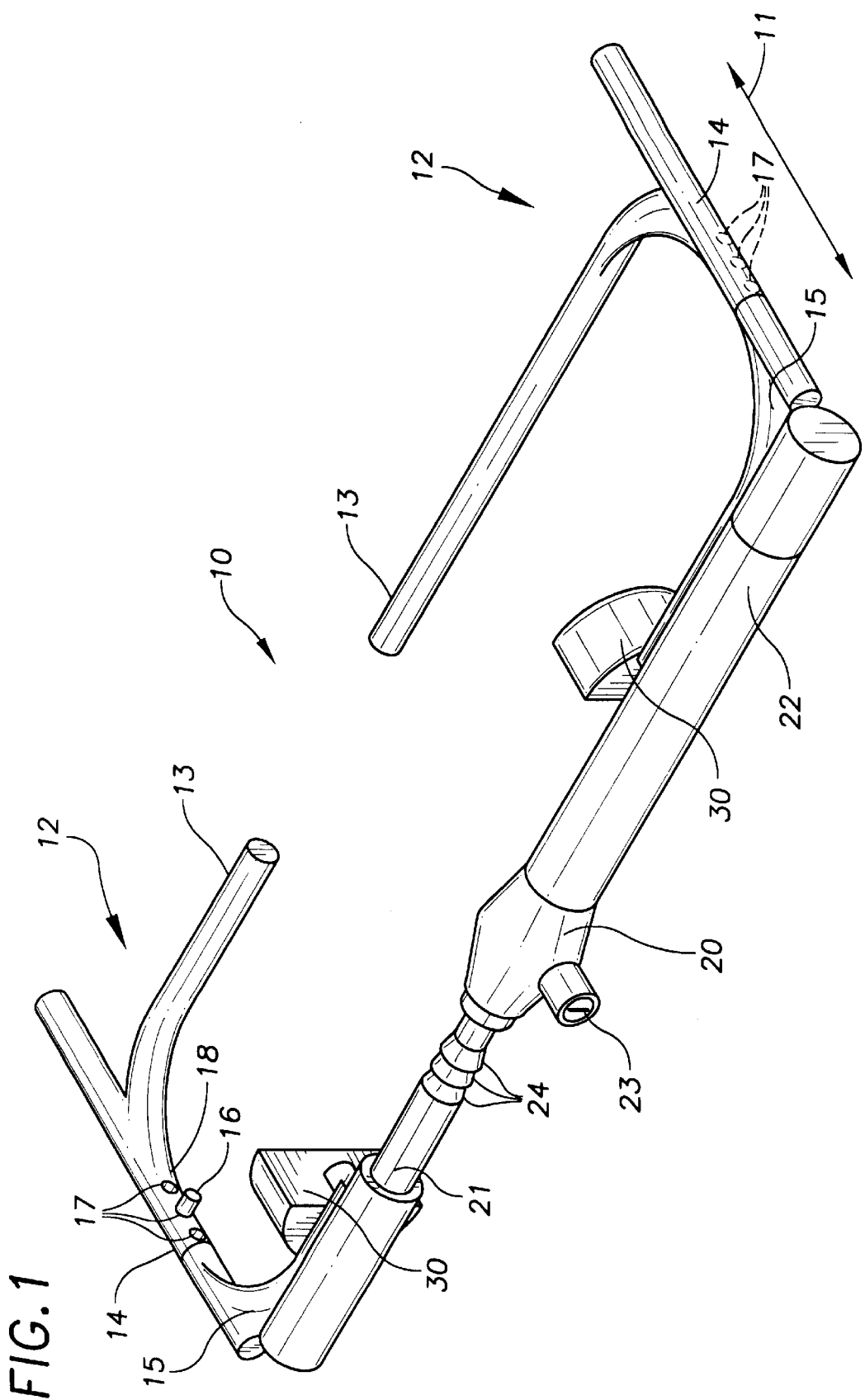
FIG. 1 is an isometric view of the wheel locking device.

As can be seen in the following description the wheel locking device is adjustable so that it may be attached to wheels of different diameters and widths. Additionally the wheel locking device is particularly suitable for trailer tires, motorcycles and ATV vehicles since it is constructed of lightweight tubular components. The device comprises adjustable width hooks which are slidably positionable for various tire diameters. The device is first installed on a tire to be locked by adjusting the width adjustments of the hooks and then inserting the width adjustment set pin which is accessible only when the device is not installed on a tire. Once each hook is placed around a tire, the hooks are then slidably locked together by a slidable locking mechanism while a pair of wheel chocks mesh with an inside surface of the wheel preventing the tire from rotating when the device is attached and locked in place. The wheel diameter slidable positioning means functions both as a wheel diameter adjustment means and a locking means for the two hooked members.

Referring to the figures in detail., FIG. 1 is an isometric view of the wheel lock 10 with two hooked members 12 each hook member having a back bar member 13 which extends around a back of a tire to be locked. The hook members 12 also include a front bar member 15 while the distance between the front bar member 15 and back bar member 13 are adjustably connected by a width adjustment means 14 located on each hook member 12. The width adjusting means 14 allows the device to be fitted to tires of different widths by providing the back bar member 13 to slidingiy engage with the front bar member 15 and then locked in place by the use of locking pin 16 which extends through aperture 17. As indicated by the double headed arrow 11 on FIG. 1 the distance between back member 13 and front member 15 can be varied by the width adjustment means. A locking pin 16 is used to lock the width adjustment means 14. The locking pin 16 is preferable constructed of high strength steel while the front bar member and back bar member are constructed of thick walled steel tubular material thereby providing strength necessary to assure the device will not be defeated. The locking pin 16 is inserted into the locking means 14 through the appropriate aligned locking apertures 17 as needed while the apertures 17 are open toward a surface of the locking means which surface 18 faces the tire tread to be locked. The positioning of the locking pin 16 in this matter prevents the locking pin 16 from being removed when the device is installed on a tire.

The two hook members 12 are attached to a diameter adjustment locking means 20 which is comprised of a male member 21 and a female receiving member 22 which slidingly received the male member 21 and which male member 21 is locked in position by a locking means 23. The male member 21 is preferable constructed of solid corrosion resistant material while the female member is preferably constructed of tubular material thereby allowing the male member 21 to be inserted into the open female member 22. The male member 21 further includes a plurality of locking notches 24 incrementally positioned on the male member 21 end which is inserted into the female member 22 whereby the notches provides a means for locking the male 21 and female 22 members together at various positions which functions as a wheel diameter adjustment means. A keyed locking means 23 is securely attached to the end of the female member 22 and locks on a selected notch 24 depending on the diameter of the wheel to be locked.

A pair of adjustable wheel chocks 30 are provided on an inside surface of the male member 21 and female member 22 and are further diameter adjustable with locking pins accessible only when the device is not installed on a tire. The wheel chocks 30 are shaped as a half circle while the curved surface is suited to mesh with an inside wheel rim surface to be locked. The adjustment means for the wheel chocks is adjusted prior to installing the separate hooked ends and after the width adjustments have been accomplished as described above.

The various members which are used to construct this device are preferably tubular high strength steel components such as chrome plated high carbon steel thereby providing a corrosion resistant device which is also lightweight materials.

It is noted that the embodiment of the Wheel Lock described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A Wheel Lock comprising a pair of hooked members each hooked member further comprising a back bar member which extends along a back of a wheel to be locked and a front bar member which extends along a front of a wheel to be locked and a hooked member width adjustable means positioned between the front bar member and the back bar member which width adjustable means provides a means for adjusting the distance between the front and back bar members and which adjustable means is only accessible if the wheel lock is not installed on a wheel to be locked, a female bar member extending from a front bar member of one hooked member and a male bar member extending from a front bar member of the other hooked member whereby the male bar member is received by the female bar member so that the hooked members are positioned at 180° to each other on the wheel and further the hooked members are adjustable to wheel diameter by drawing the male member into or out of the female member, a male member keyed locking means is provided on an end of the female member and provides a means for locking the male member in position within the female member, a pair of half circle chocks are provided for preventing the rotation of the wheel lock on the wheel while one chock is mounted to an inside surface of the male member and the other chock is mounted to an inside surface of the female member, the chocks further are adjustably positioned to contact an inside rim surface of the wheel to be locked;

each of the hooked member width adjustable means positioned between the front bar member and the back bar member further comprising a number of alienable locking apertures distributed between the back bar member and the front bar member that are only open on a surface of the width adjustable means that faces a thread surface of the wheel to be locked when the wheel lock is in position locking the wheel to be locked; and a retaining pin that is insertable into the width adjustable means only when the wheel lock is not installed on a wheel to be locked and further wherein the number of locking apertures are distributed to allow for incrementally adjusting the distance between the front and back bar members.

2. The Wheel Lock of claim 1, wherein said male member keyed locking means further comprises a keyed lock positioned on an end of the female member and including a central aperture for inserting the male member and further providing a means for locking the male member in position in the female member so that the male member may not be withdrawn from the female member.

\* \* \* \* \*